Dec. 4, 1934.     G. J. NEHER     1,983,094
FLEXIBLE COUPLING
Filed March 15, 1934
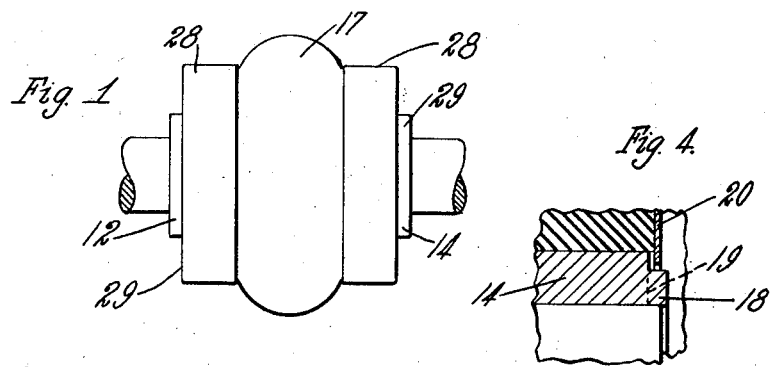
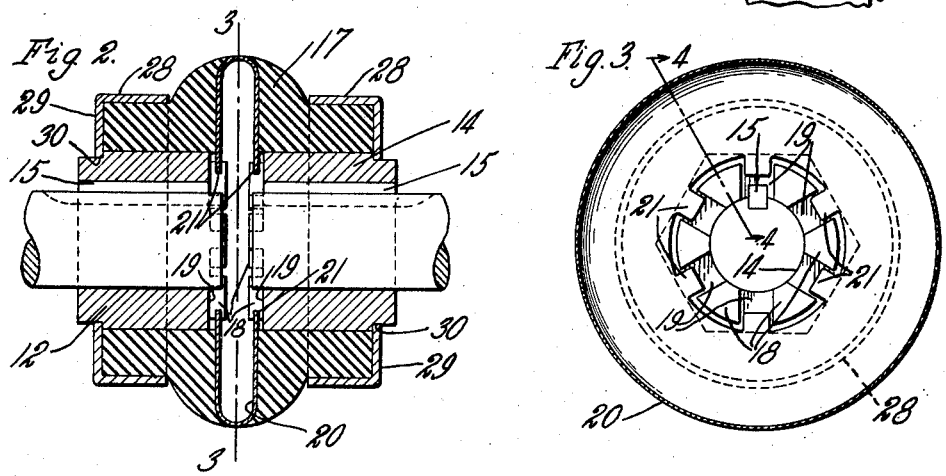
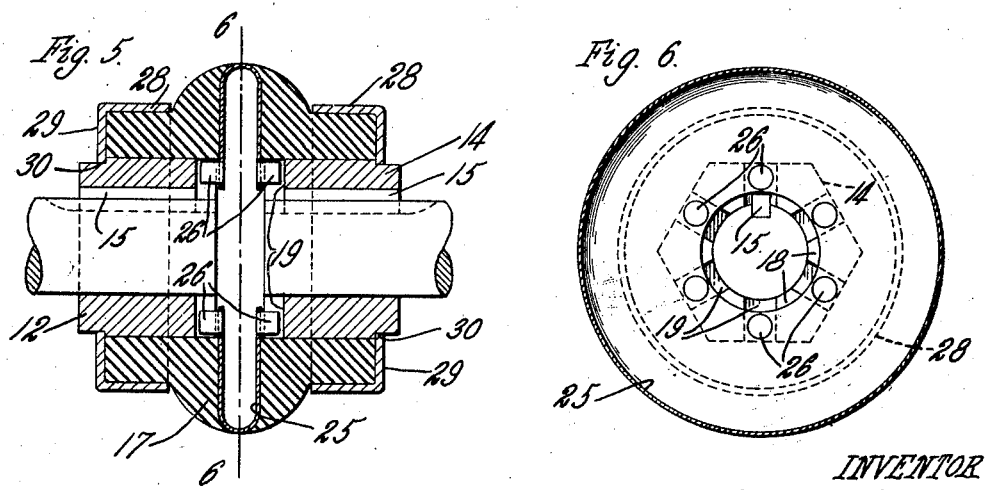
INVENTOR
George J. Neher
by Parker, Prochnow & Farmer
ATTORNEYS Patented Dec. 4, 1934

1,983,094

UNITED STATES PATENT OFFICE 1,983,094

FLEXIBLE COUPLING

George J. Neher, Buffalo, N. Y.

Application March 15, 1934, Serial No. 715,675

4 Claims. (Cl. 64—96)

This invention relates to improvements in flexible couplings, particularly of the kind adapted for transmitting power from one shaft to another in cases where the two shafts are not in correct axial alinement.

The objects of this invention are to provide a coupling of this kind of inexpensive construction and which is so formed that the initial power or torque is transmitted through rubber or similar flexible material while greater torque or power is transmitted through a metal connecting member; also to provide a coupling of this kind by means of which power can be transmitted from one shaft to another even if one shaft is offset relatively to the other shaft; also to provide a coupling of this kind in which the connecting member may be vulcanized to and carried by the rubber part of the coupling independently of the metal parts thereof; also to provide a coupling of this kind in which all of the parts thereof are held in operative relation to each other by means of the rubber portion of the coupling, so that the coupling can be easily applied to the shafts which it is intended to connect; also to improve the construction of flexible couplings of this type in other respects hereinafter specified.

In the accompanying drawing:

Fig. 1 is a side view of a coupling embodying this invention.

Fig. 2 is a central sectional view thereof.

Fig. 3 is a transverse section thereof on line 3—3, Fig. 2.

Fig. 4 is a fragmentary cross section on line 4—4, Fig. 3.

Fig. 5 is a longitudinal central sectional elevation of a coupling of modified construction.

Fig. 6 is a transverse sectional elevation thereof on line 6—6, Fig. 5.

The coupling includes two sleeves 12 and 14, the internal diameters of which are such as to fit the shafts to be connected and any suitable means for securing the sleeves to the shafts may be employed, such as, for example, keys 15 arranged in suitable keyways in the sleeves and shafts. Other suitable means may, of course, be employed in place of the keyways shown for securing the sleeves 12 and 14 to the shafts to be connected. The outer surfaces of the sleeves may be of any suitable form and are preferably non-circular or roughened to afford a secure grip to an outer flexible body portion 17 of the coupling, which is preferably made of rubber or other elastic substance. In the construction shown, the outer surfaces of the sleeves are of hexagonal cross section, but these surfaces may be of any other cross sectional shape. For example, the sleeves may be of substantially cylindrical form and provided with grooves or recesses in which the rubber may be embedded to form a secure driving connection between the sleeves and the rubber body portion 17.

My improved coupling includes a connecting member of metal or other material of greater rigidity than the elastic body portion 17, and this connecting member is arranged to form a driving connection between the two sleeves after a certain amount of torque has been transmitted from one sleeve to the other of the flexible body portion 17 of the coupling. This connecting member therefore, has portions which move into a driving connection to the sleeves after the torque transmitted from one sleeve to the other exceeds a certain amount, and this loose or non-contacting connection of the connecting member with the sleeves also renders the sleeves adjustable relatively to each other and to the connecting member, so that the coupling can be used to connect shafts that are either angularly out of alinement with each other or offset relatively to each other.

Any suitable driving connection between the sleeves and the connecting member may be provided. In the particular construction shown, which merely illustrates one embodiment of my invention, the adjacent ends of the sleeves, which are spaced apart, are provided with suitable teeth or projections 18 separated by means of a plurality of radial slots or grooves 19 in the adjacent ends of the sleeves. Driving teeth or projections of any other form may, of course, be provided, if desired. This connecting member may be of any suitable or desired form and in the construction shown, a relatively thin metal member 20 of annular form and of U-shaped cross section is shown, the inner edges of which are provided with suitable parts adapted to enter into the grooves or recesses 19 between the teeth 18. In the construction shown in Figs. 2 and 3, integrally projecting teeth or parts 21 are formed on the inner edges of the connecting member, these teeth corresponding in number to the number of grooves 19 in the coupling sleeves, and the connecting member is of such shape that the teeth or projections 21 on one side thereof engage in the grooves or recesses 19 of one of the coupling members, while the corresponding teeth 21 of the other side of the connecting member enter into grooves of the other sleeve of the coupling. The teeth or projections 21 of the connecting member are preferably of materially less width than the width of the grooves or slots 19 in the sleeves, so as to permit the connecting member to cooperate with the sleeves even if the two shafts to which the sleeves are connected are materially out of alinement.

The connecting member 20 is also vulcanized to the rubber body portion 17 and this is preferably done while the connecting member is held in such a manner that the teeth or projections 21 thereof are arranged substantially midway of the grooves or slots 19 in the sleeves 12 and 14. In order to accomplish this result, the coupling sleeves and the connecting member 20 are placed into a suitable vulcanizing mold in correct relation to each other and the rubber is then vulcanized to the exterior of the sleeves and the connecting member 20. When the parts have been secured in this position, it will be obvious that when the coupling is in use, the initial torque from one shaft to the other is transmitted entirely through the rubber body portion 17, while the teeth thereof are out of contact with the sides of the slots in the sleeves. If the torque is increased, the edges of the teeth 21 of the connecting member move into engagement with the sides of the slots 19 of the sleeves, so that all additional torque is transmitted through the connecting member 20.

The annular arched or channel portion of the connecting member 20 preferably extends outwardly to a material extent beyond the sleeves 12 and 14, and thus affords extended transverse surfaces to which the rubber body 17 and the coupling member may be vulcanized. This structure of the connecting member further enables the rubber to transmit the torque more easily, since the amount of force to transmit a certain torque decreases with the distance from the axis of rotation. By constructing the connecting member 20 as shown, the usual core necessary to make the rubber connecting member hollow is eliminated and the cost of production of the coupling is consequently materially reduced, since the rubber can be molded and vulcanized to the parts of the coupling in a single operation. Furthermore, the use of a connecting member, such as shown between the adjacent ends of the sleeves, makes it possible for the coupling to transmit power from one shaft to another where the shafts are offset relatively to each other, as well as enabling the coupling to act in the manner of a universal coupling, where the two shafts are arranged at an angle to each other. When one shaft is offset relatively to the other, the connecting member 20 will be forced by the rubber portion of the coupling to occupy a position at an inclination from that shown in Fig. 2, and will thus better adapt itself for engagement in the grooves or slots in the ends of the sleeves. The outwardly extending portion of the connecting member, if made of relatively thin metal, also has a considerable resilience, which supplements the resilience of the rubber portion of the coupling, so that torque is somewhat more yieldingly transmitted from one shaft to another than when a rigid coupling is employed. The rubber may extend beyond and cover the connecting member, or may terminate at the outer edge portion of the connecting member, as shown in the drawing.

In the particular construction shown in Figs. 5 and 6, a connecting member 25 of slightly different construction is shown in which the integrally formed teeth are replaced by pins 26 extending outwardly from the sides of the connecting member and projecting into the grooves in the ends of the sleeves. It will be obvious that other forms of connecting members may be employed to form a flexible connection between the adjacent ends of the sleeves.

If desired the ends of the rubber coupling member may be covered by metal caps 28, which may have cylindrical portions extending over the ends of the rubber body portion of the coupling member and radially extending flanges 29 suitably secured at 30 to the sleeves 12 and 14, for example, by welding. These caps have the functions of preventing the deformation of the flexible portion of the coupling member while the same is submitted to strains, and tend to hold the rubber body portion in contact with the sleeves 12 and 14, thus reinforcing the vulcanized connections between the coupling sleeves and the flexible body portion. The end caps also protect the flexible body portion against damage. If desired, these caps may be omitted or replaced by protecting devices of other form.

The coupling described, in addition to the advantages specified, has the further advantage that it can be easily and inexpensively manufactured and operates noiselessly, since any sounds that might be caused by the contacts between metallic parts are muffled by the surrounding body portion of rubber.

I claim as my invention:

1. A flexible coupling for connecting the ends of two shafts, including metallic annular sleeves rigidly secured to the adjacent ends of the shafts and spaced apart, said sleeves having projections formed thereon, a connecting member having parts adapted to engage said projections to form a driving connection between said sleeves, and a body portion of flexible material secured to the outer surfaces of said sleeves and said connecting member and constituting the sole means for supporting said connecting member in its operative position.

2. A flexible coupling including a pair of sleeves adapted to be secured to the adjacent ends of two shafts to be connected, said sleeves having projections formed thereon adjacent to the ends thereof and having the adjacent ends spaced apart, a connecting member having portions extending between said projections to form a driving connection between said sleeves and spaced from said projections when no torque is transmitted, a body portion of flexible material secured to said sleeves and to said connecting member and supporting said connecting member out of contact with said sleeves, to permit initial torque to be transmitted from one sleeve to the other solely through said flexible body portion, said body portion yielding to permit a driving engagement between said connecting member and the projections on said sleeves when a torque in excess of said initial torque is transmitted from one sleeve to the other.

3. A flexible coupling including a pair of sleeves adapted to be secured to the adjacent ends of a driving shaft and a driven shaft, a connecting member having parts adapted to engage with said sleeves to form a driving connection between said sleeves, and adapted to occupy a position out of driving engagement with said sleeves when no torque is transmitted from one sleeve to the other, a flexible body portion secured to said sleeves and said connecting member and constituting the sole means for supporting said connecting member in operative relation to said sleeves, and holding said connecting member out of driving connection with said sleeves when no torque is transmitted from one sleeve to the other.

4. A flexible coupling comprising a pair of sleeves adapted to be secured to a driving shaft and a driven shaft and having non-circular outer surfaces, a rubber body portion vulcanized to said outer surfaces, a connecting member also vulcanized to said rubber body portion and having parts adapted to make a driving contact with parts of said sleeves and normally supported by said rubber body portion in a position out of said driving contact, whereby initial torque causes said connecting member to move into driving engagement with said sleeves.

GEORGE J. NEHER.